Patented Aug. 4, 1936

2,049,431

UNITED STATES PATENT OFFICE 2,049,431

SAPONIFICATION OF MATERIALS COMPRISING SAPONIFIABLE ESTERS OF CELLULOSE

Henry Dreyfus, London, England

No Drawing. Application March 23, 1934, Serial No. 717,071. In Great Britain March 29, 1933

8 Claims. (Cl. 8—20)

This invention relates to the manufacture of filaments, threads, fibres, yarns, ribbons, fabrics and like materials made of or containing cellulose esters, and particularly to processes for the saponification of such materials and to the products obtainable by such processes.

According to the present invention, in the saponification of materials comprising cellulose acetate and other saponifiable esters of cellulose the material is treated with a saponifying agent comprising calcium hydroxide or other alkaline compounds of alkaline earth metals and quickly dried. The process of the present invention is broadly applicable to saponifiable esters of cellulose, for example cellulose acetate, formate and propionate, butyrate, and oxy-ethyl cellulose acetate. The invention, although not limited to the treatment of materials containing esters of any particular ester content, finds its most important application in connection with materials containing acetone soluble cellulose acetates.

The saponifying agent of the present invention preferably comprises calcium hydroxide which, in spite of its weakly alkaline properties and sparing solubility, has been found to afford excellent results in the absence of any stronger saponifying agent. Other alkaline compounds of alkaline earth metals may however be used, for example the hydroxides of barium and strontium have afforded good results. The saponifying agent is preferably employed in solution, or in the form of a dispersion or very fine suspension in an aqueous medium. The saponification may be effected in the presence of an alcoholic compound, for example methyl or ethyl alcohol, which may itself play a part in the reaction. Saponification may be carried out in the presence of buffer salts. For example, in the saponification of cellulose acetate, sodium or calcium acetate may be present.

The materials which undergo saponification may be treated with swelling agents for the cellulose derivative prior to or during the saponifying treatment. Examples of suitable swelling agents where the material treated comprises cellulose acetate are: acetone, methyl ethyl ketone, methyl alcohol, ethylene glycol, glycerine and other poly-hydroxy alcohols, dioxane, and methylene ethylene oxide. The swelling agent should not be acid and should be miscible with the medium containing the saponifying agent. The saponifying agent may be applied in the form of a solution or composition containing the swelling agent. Means may be employed for increasing the amount of saponifying agent taken up by the material. For example, the saponifying agent may be applied in the presence of hydroscopic substances, e. g. sodium acetate or calcium chloride. Again, the saponifying agent may be applied in the form of a liquid composition of relatively high viscosity, the desired viscosity being obtained for example by the incorporation of suitable substances in the composition. Examples of such substances are the silicates of the alkali metals and soluble salts of fatty acids of high molecular weight, for example sodium oleate. The saponifying agent may also contain, for example, gum tragacanth, gum tragasol, gum arabic, dextrins, British gum, water-soluble cellulose ethers, starches, and particularly potato starch. Mineral thickening agents, for example Fuller's earth, may also be present, although in general the organic thickening agents are to be preferred.

Any suitable means may be adopted for applying the saponifying agent to the material. The application may, for example, be effected by a bath treatment or by passing the materials through padding rolls or the like or in contact with wicks, brushes and the like. The first two methods are to be preferred. Where the material is in yarn, thread or like form several or a large number of threads, yarns or bundles of filaments may be simultaneously treated in warp formation with advantage.

The step of quickly drying the materials after treatment with the saponifying agent may be most advantageously carried out by passing the materials over heated drums or the like, the temperature of the drum and speed of feed of the materials thereto being adjusted so that the materials leaving the drum are substantially dry. As it appears that at least the greater part of the saponification occurs during the drying stage, control of the time during which the material is heated affords a means of controlling the amount of saponification occurring. Where saponification is effected in the presence of a volatile organic substance, for example where an alcohol is employed to assist the inorganic saponifying agent, or where a volatile swelling agent is used, suitable means may be employed to recover solvent vapours produced during the drying process.

The dried materials are preferably washed free from the saponifying agent and may then be wound or folded or if desired subjected to further treatments prior to winding or folding.

The following examples illustrate the invention:—

Example 1

Cellulose acetate yarn is drawn from bobbins, passed through a reed and under a roller which is partially immersed in a bath containing a saturated solution of calcium hydroxide. The warp of yarns is taken out of the bath and immediately on to a hollow steam heated drum of large diameter. The materials pass round this drum and in so doing undergo saponification. The materials leaving the drum are saponified to the desired extent. They are washed, dried and collected by suitable means.

If desired a series of heating rolls may be substituted for the single heating roll described.

Example 2

The process is carried out as described in Example 1 except that instead of a saturated solution of calcium hydroxide a dispersion or very fine suspension of calcium hydroxide in water is employed containing approximately 1% of calcium hydroxide.

Example 3

The process is carried out as described in Example 1 except that the solution of calcium hydroxide contains 5% of water-soluble methyl cellulose.

In all the above examples sheet materials, for example fabrics, can be treated in the same way.

The process of the invention is capable of effecting very substantial and important alterations in the properties of the materials treated. For instance the process may impart to the materials an affinity for cotton dyes, which may or may not involve loss of affinity for cellulose ester dyes. In addition, the materials may be rendered less liable to such faults as slip or laddering when in fabric form. They may, moreover, be rendered resistant to agents which tend to alter the lustre of the unsaponified materials. A much more important effect of the saponification process may however be to increase the tensile strength of the materials. Thus the process of the invention may produce not only materials of considerably greater tensile strength per denier, especially wet tensile strength, than the unsaponified materials, but also products of greater strength even when dry than the strongest regenerated cellulosic materials produced, for example, by the viscose process. Particularly strong products are obtainable where the materials treated have undergone a stretching process such for example as is described in U. S. application S. No. 378,684 filed July 16, 1929. Particularly valuable results are obtained when the materials are stretched to the extent of 100%, 200%, or even 500% or more of the original length. The stretching process may be effected in two or more steps, since as described in U. S. application S. No. 573,424 filed November 6, 1931, it is possible by this means to produce a greater increase in the strength of the materials than when the stretching operation is carried out in one stage. Between the several steps of the stretching operation the tension may be relaxed, the material being allowed to shrink.

In carrying out the present invention the materials, in yarn or thread form, may be stretched continuously with the saponification step. The materials may, for example, be unwound from bobbins or other suitable packages or even led continuously from the spinning apparatus in which they are produced, treated with a stretch-assisting agent and stretched in one or more stages, with or without the interposition of a shrinking step, and passed continuously on to apparatus wherein the saponification is carried out. When in such a continuous process it is desired to effect saponification in the presence of a swelling agent, at least a part of this agent may be carried over by the materials from the stretching bath.

Products of particularly high tensile strength may also be obtained where the starting materials comprise cellulose esters of relatively high viscosity. Thus for example while materials of viscosity as low as 10 or even less may be treated by the process of the invention with some advantage, considerably stronger products are obtainable where the viscosity of the ester is at least 30. With viscosities between 50 and 100, products of even greater tensile strength are obtainable, and I have obtained the best results of all from materials comprising cellulose acetate of viscosity between 100 and 200. These figures represent the viscosities of 6% solutions of the cellulose ester in acetone at 25° C. compared with the viscosity of glycerine at the same temperature, taken as a standard of 100.

What I claim and desire to secure by Letters Patent is:—

1. Process for the saponification of filaments, threads, yarns, ribbons and like materials having a basis of cellulose ester, which comprises applying to the materials an alkaline compound of an alkaline earth metal in an aqueous medium, and immediately subjecting the materials to elevated temperatures so that they are rapidly dried and are saponified by said alkaline earth compound during the drying.

2. Process for the saponification of filaments, threads, yarns, ribbons and like materials having a basis of organic esters of cellulose, which comprises applying to the materials an alkaline earth metal hydroxide in an aqueous medium, and immediately subjecting the materials to elevated temperatures so that they are rapidly dried and are saponified by said alkaline earth metal hydroxide during the drying.

3. Process for the saponification of filaments, threads, yarns, ribbons and like materials having a basis of cellulose acetate, which comprises applying to the materials an alkaline earth metal hydroxide in an aqueous medium, and immediately subjecting the materials to elevated temperatures so that they are rapidly dried and are saponified by said alkaline earth metal hydroxide during the drying.

4. Process for the saponification of filaments, threads, yarns, ribbons and like materials having a basis of organic derivatives of cellulose, which comprises applying to the materials a saponifying agent consisting substantially of calcium hydroxide in an aqueous medium, and immediately subjecting the materials to elevated temperatures so that they are rapidly dried and are saponified by said calcium hydroxide during the drying.

5. Process for the saponification of filaments, threads, yarns, ribbons and like materials having a basis of cellulose acetate, which comprises applying to the materials a saponifying agent consisting substantially of calcium hydroxide in an aqueous medium, and immediately subjecting the materials to elevated temperatures so that they are rapidly dried and are saponified by said calcium hydroxide during the drying.

6. Process for the saponification of filaments, threads, yarns, ribbons and like materials having a basis of cellulose acetate, which comprises applying to the materials a saponifying agent consisting substantially of a dispersion of calcium hydroxide in water, and immediately subjecting the materials to elevated temperatures so that they are rapidly dried and are saponified by said calcium hydroxide during the drying.

7. Process for the saponification of filaments, threads, yarns, ribbons and like materials having a basis of cellulose acetate, which comprises applying to the materials a saponifying agent consisting substantially of calcium hydroxide in water in the presence of a substance capable of forming highly viscous solutions with water, which substance assists the retention of the saponifying medium by the materials, and immediately subjecting the materials to elevated temperatures so that they are rapidly dried and are saponified by said calcium hydroxide during the drying.

8. Process for the saponification of filaments, threads, yarns, ribbons and like materials having a basis of cellulose acetate, which comprises applying to the materials a saponifying agent consisting substantially of calcium hydroxide in water in the presence of a water-soluble cellulose ether which assists the retention of the saponifying medium by the materials, and immediately subjecting the materials to elevated temperatures so that they are rapidly dried and are saponified by said calcium hydroxide during the drying.

HENRY DREYFUS.